INVENTOR.
JAMES W. HENDRY

BY

ATTORNEYS

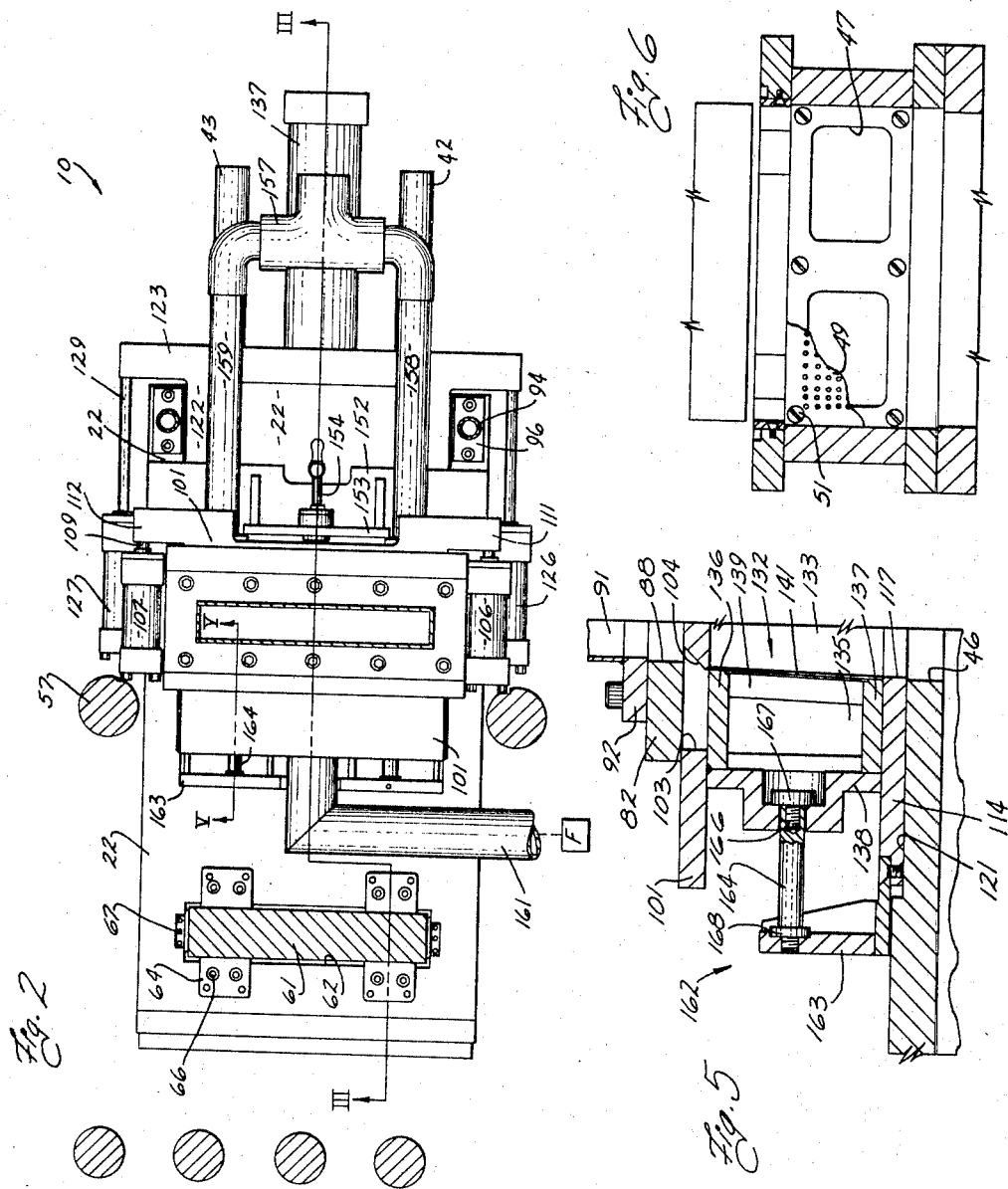

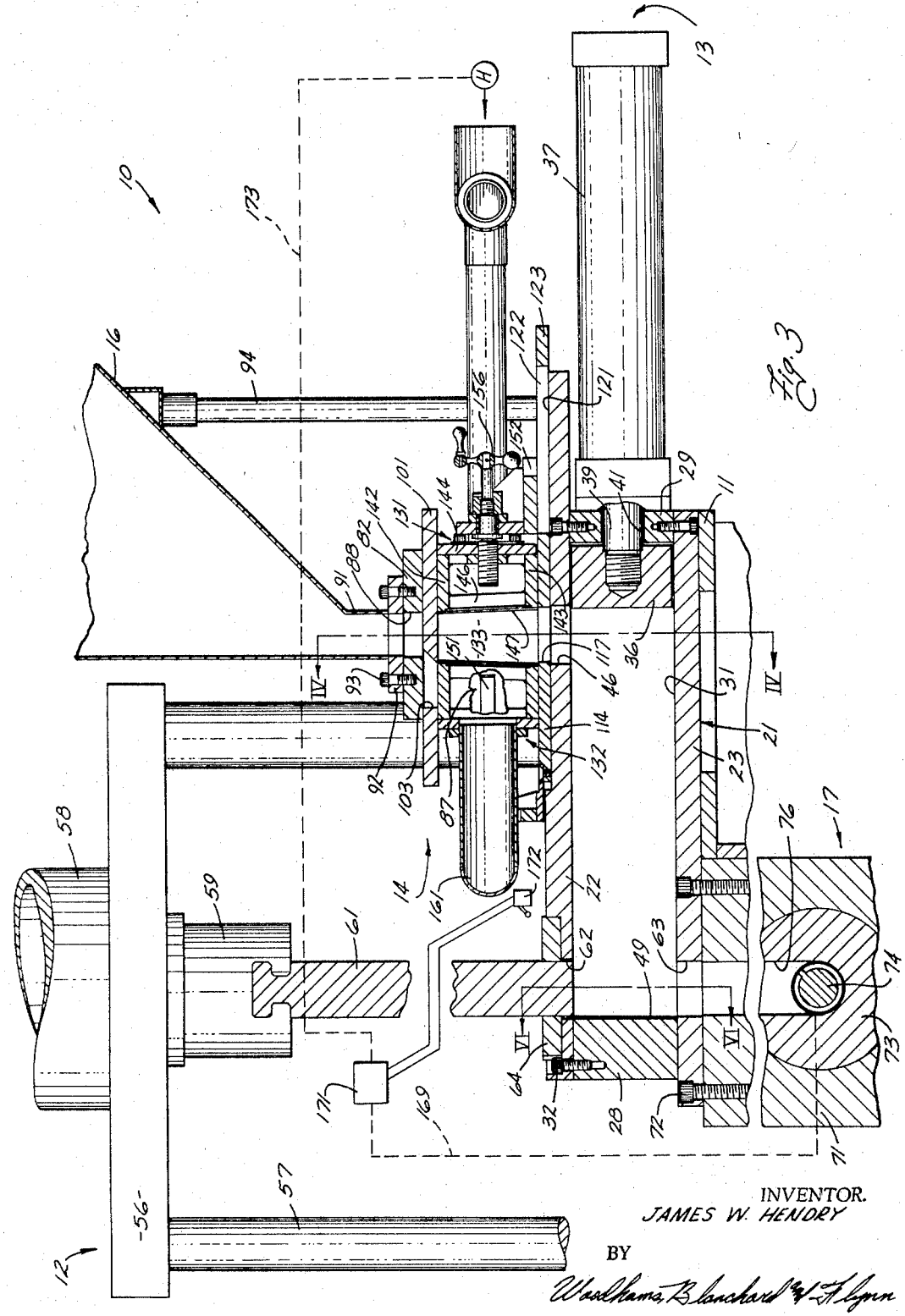

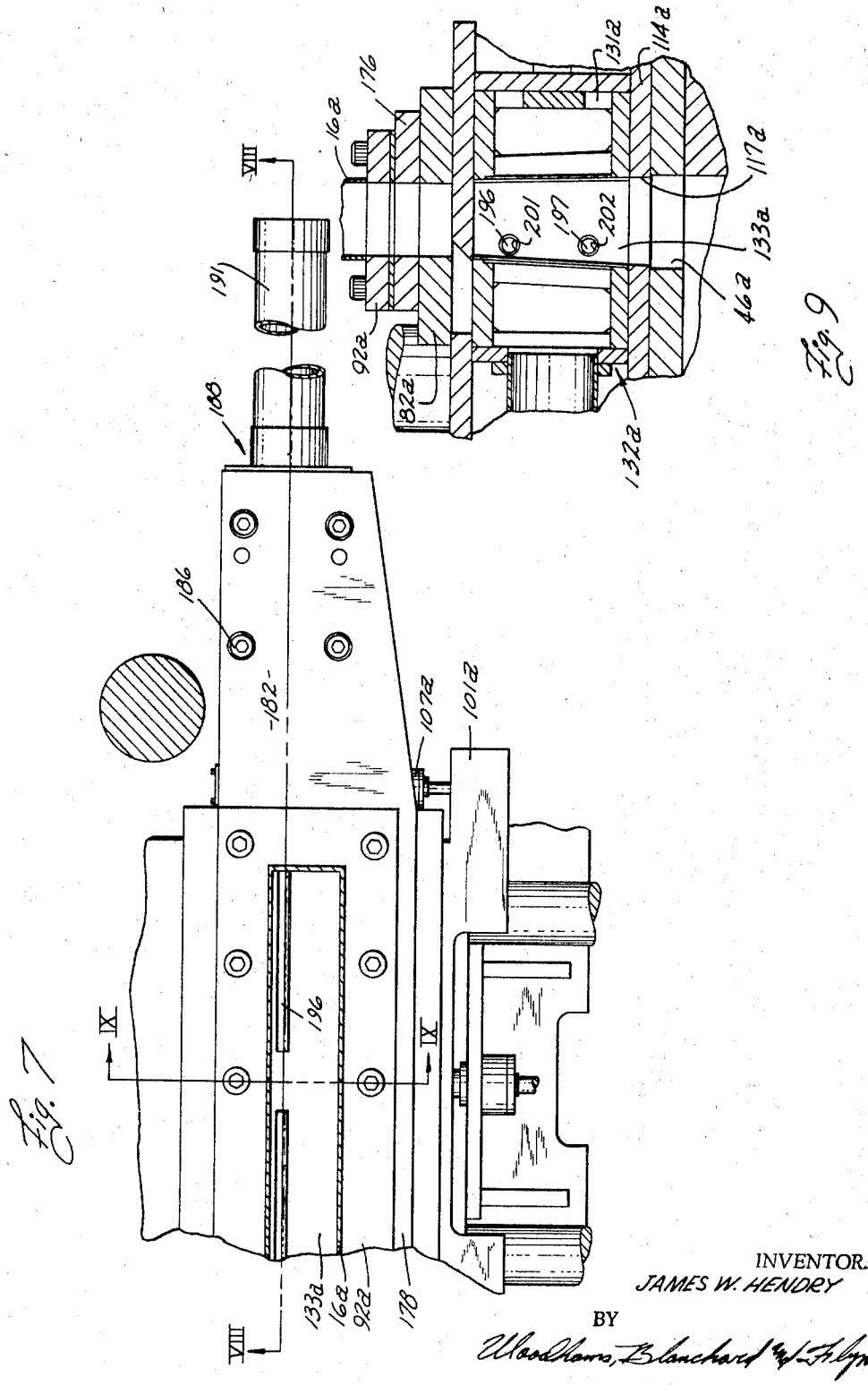

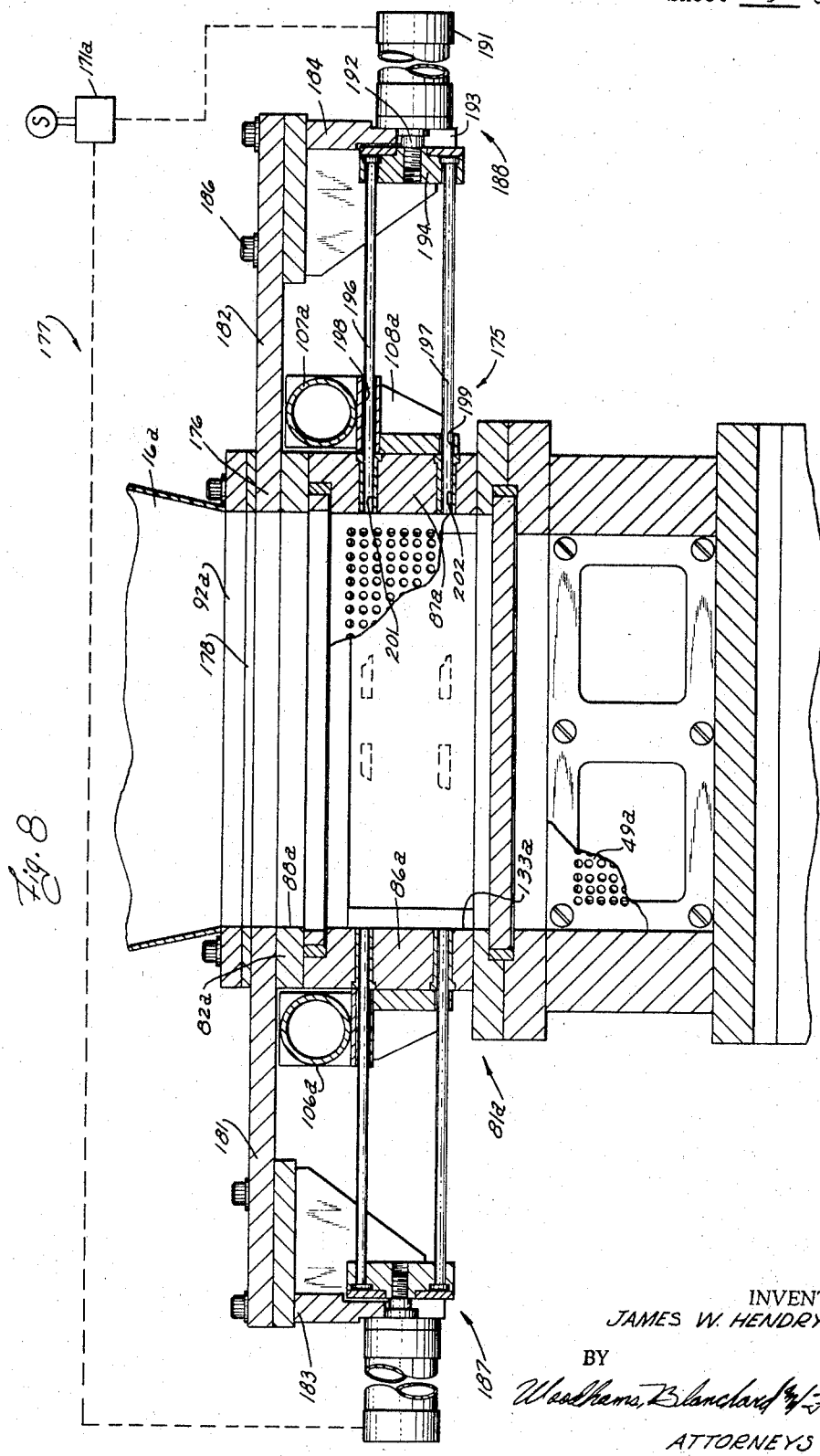

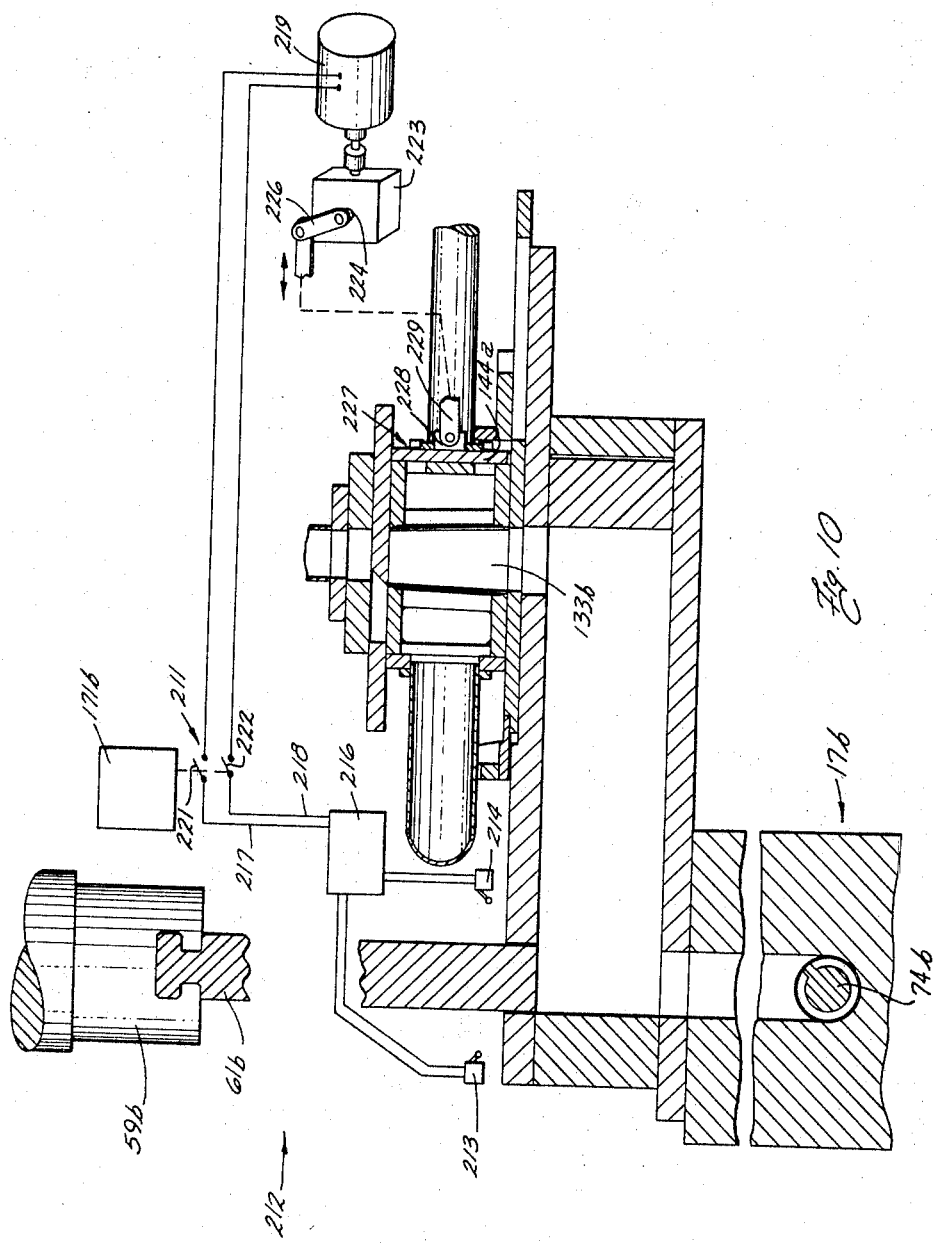

United States Patent Office 3,425,673
Patented Feb. 4, 1969

3,425,673
MECHANICAL HEATING DEVICE
James W. Hendry, Scottsburg, Ind., assignor to Borg-Warner Corporation, Chicago, Ill., a corporation of Illinois
Filed July 14, 1965, Ser. No. 471,835
U.S. Cl. 263—29                                13 Claims
Int. Cl. F27b *1/00;* F26b *17/12*

ABSTRACT OF THE DISCLOSURE

A machine for heating and feeding plastic material to a consuming device, which machine includes a heating chamber and means for filling the chamber with a charge of plastic granules. A pair of oppositely disposed perforate walls separate the chamber from inlet and outlet manifolds which inject heated fluid into the chamber and exhaust said fluid from the chamber whereby the fluid flows uniformly through the granular material for heating same. Means are provided for moving the perforate outlet wall of the chamber to disengage the softened charge therefrom and away from the inlet wall for opening the bottom of the chamber so that the heated charge will freely drop therefrom.

---

This invention relates to an improved process and apparatus for heating and feeding plastic granules and more particularly relates to an improved process and apparatus for heating and feeding plastic granules preparatory to discharging same to a consuming device in which the configuration of the heating zone is changed to assist release of the charge of plastic material therefrom.

The present invention is an improvement of the process and apparatus set forth in application Ser. No. 120,407, filed June 28, 1961, now Patent No. 3,163,888, and assigned to the assignee of the present application. In the course of continuing efforts to improve the heater and heating process of said application, a number of improvements have been made over the previously disclosed apparatus which it is the purpose of this application to disclose and claim. The apparatus of the present invention is particularly intended to be a more commercially desirable and effective device for preheating and feeding material to ejection molding or extrusion machines as desired.

Hence, the objects of this invention include:

(1) To provide an improved process and apparatus for heating and feeding plastic granules to a consuming device such as injection molding or extrusion machines.

(2) To provide an apparatus, as aforesaid, constituting a more commercially practicable version of the machine disclosed in the above-mentioned application Ser. No. 120,407.

(3) To provide an apparatus, as aforesaid, in which the heating chamber is provided with opposed perforate walls through which a heating fluid is passed for heating a charge of plastic material in the chamber and in which the configuration of the chamber is altered to insure release of the charge when sufficiently heated.

(4) To provide an apparatus, as aforesaid, in which the bottom of the chamber is opened to drop the charge out therefrom and the fluid outlet side of the chamber is moved away from the charge to insure that the charge will will drop at the proper time, which thus avoids interlocking or adhesion of the surface of the charge with the walls of the chamber.

(5) To provide an apparatus, as aforesaid, which is adaptable for heating plasticizable materials sufficiently that such materials tend to adhere to surfaces of the machine in contact therewith but which in spite of such adhesion allows the material charge to be carried from the heating chamber by relatively small forces such as gravitational forces.

(6) To provide an apparatus, as aforesaid, in which the size of the heating chamber may be altered in response to the rate of feed of the heated material to a consuming device such as an extrusion or injection molding machine and in which the amount of material admitted to the chamber is controlled by the initial chamber size.

(7) To provide an apparatus, as aforesaid, which is of sufficient simplicity and sturdiness that it will be economical in its construction, maintenance and operation.

(8) To provide a process, as aforesaid, for preheating a charge of plastic material prior to injection molding or extrusion thereof in which a heated fluid, such as air, circulates through the charge as it is held at the sides, top and bottom thereof in a chamber.

(9) To provide a process, as aforesaid, in which the configuration of the chamber is changed to release the charge therefrom and to assure that the charge will drop from the chamber when the bottom thereof is open.

(10) To provide a process, as aforesaid, in which charges of the correct size for efficient feeding will be delivered at a preselected rate to a consuming unit such as an injection molding or extrusion machine.

Other objects and purposes of the invention will be apparent to persons acquainted with apparatus of this general type upon reading the following specification and inspecting the accompanying drawings.

In the drawings:

FIGURE 2 is a sectional view of the machine of FIGURE 1 substantially as taken on the line II—II of FIGURE 1.

FIGURE 3 is an enlarged, partially broken central cross-sectional view of the machine of FIGURE 1 substantially as taken on the line III—III of FIGURE 2.

FIGURE 5 is an enlarged fragmentary sectional view substantially as taken on the line V—V of FIGURE 2.

FIGURE 6 is a partially broken, fragmentary sectional view substantially as taken on the line VI—VI of FIGURE 3 and showing the feed ram in a different position of operation.

FIGURE 7 is an enlarged fragment of FIGURE 2 rotated clockwise through 90 degrees and showing a modification.

FIGURE 8 is a sectional view substantially as taken on the line VIII—VIII of FIGURE 7 with the inner ends of the stripper rods shown in broken lines extended and with the stripper rods shown retracted in solid lines to illustrate an alternate position of operation.

FIGURE 9 is a fargmentary sectional view substantially as taken on the line IX—IX of FIGURE 7.

FIGURE 10 is a partially schematized, fragmentary view corresponding to FIGURE 3 and showing the modification thereof.

Figure 1:
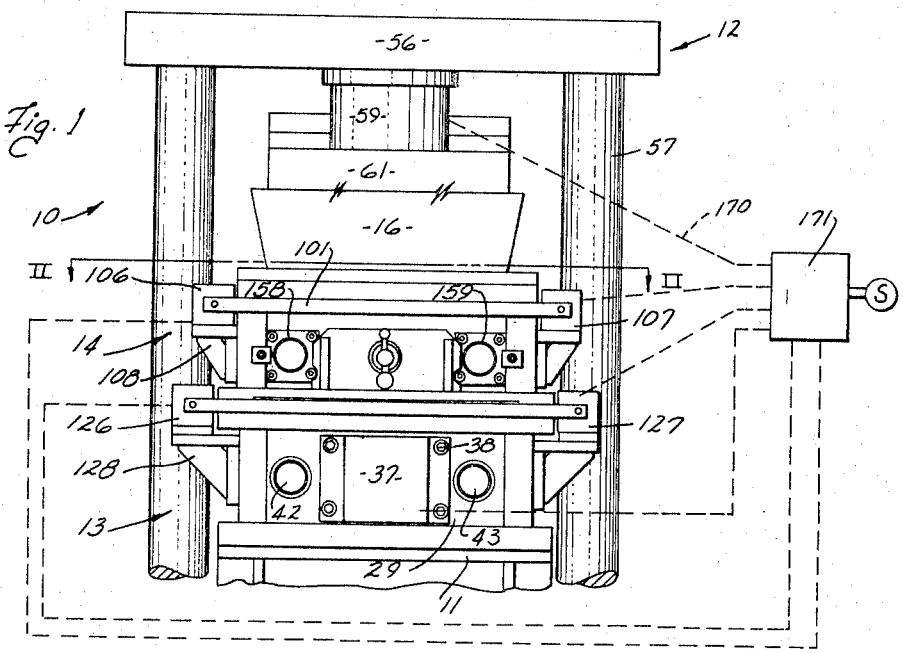
FIGURE 1 is a rear end elevational view of a preferred preheating machine embodying the invention and including a schematic representation of a control system therefor.

Certain terminology will be used in the following description for convenience in reference only and will not be limiting. The words "upwardly," "downwardly," "rightwardly" and "leftwardly" will designate the directions in the drawings to which reference is made. The words "forwardly" and "rearwardly" will refer to the normal direction of horizontal material flow through the machine, forwardly being towards the left and rearwardly being towards the right in FIGURES 2 and 3. The words "inwardly" and "outwardly" will refer to directions toward and away from, respectively, the geometric center of the machine and designated parts thereof. Said terminology will include the words above specifically mentioned, derivatives thereof and words of similar import.

General description

In general, the objects and purposes of this invention are met by providing a machine for heating and feeding plastic material to a consuming device, e.g., an injection molding or extrusion machine. The machine embodying the invention includes a heating chamber and means for filling the chamber with a charge of plastic granules. A pair of oppositely disposed perforate walls separate the chamber from inlet and outlet manifolds which inject heated fluid, preferably air, into the chamber and exhaust said fluid from said chamber, respectively, whereby the fluid flows uniformly through granular plastic material in said chamber for heating same. Means are provided for moving the perforated outlet wall of the chamber to disengage the softened charge therefrom and away from the inlet wall for opening the bottom of the chamber so that that heated charge will freely drop therefrom. Transfer and feeding means feed the heated charge to the consuming device while a second charge is admitted to and heated in the chamber.

The machine is really adapted to materials which tend to adhere relatively tightly to the walls of the chamber when sufficiently heated. The machine so adapted is provided with elongated rods insertable into the chamber adjacent and parallel to the outlet wall prior to introduction of plastic granules in the chamber. The rods allow the outlet wall and chamber wall to be retracted when the charge is heated to a single mass but before the plastic material begins to adhere strongly thereto. Withdrawal of the rods after additional heating of the material to the desired point of plasticity allows the charge to drop from the chamber.

The machine is also adaptable to means for adjusting the size of the chamber, and thus of the charge, in response to the intake rate of the consuming device.

Detailed description

The machine 10 (FIGURES 1, 2, 3 and 4) embodying the invention includes a platform 11. A feed structure 12 is fixed with respect to said platform 11. The platform 11 supports a transfer structure generally indicated at 13 which in turn supports a heating structure 14 located immediately thereabove. The machine 10 is arranged so that the material is introduced to the heating structure 14 from a hopper 16 (FIGURE 3), is heated therewithin and is then passed by the transfer structure 13 and then the feed structure 12 to a consuming device generally indicated at 17 such as a conventional injection molding or extrusion machine.

The transfer structure 13 includes a transfer housing 21. The transfer housing 21 comprises upper and lower walls 22 and 23 and upstanding side walls 26 and 27 (FIGURE 4) and forward and rearward end walls 28 and 29 (FIGURE 3), respectively, which space the upper and lower walls 22 and 23. The transfer housing 21 thereby encloses a preferably rectangular transfer passage 31. The transfer housing 21 is preferably fastened together by means of screws such as those indicated at 32 in FIGURE 3. The transfer housing 21 is directly supported upon the platform 11 and may be affixed thereto by any convenient means, not shown. A transfer ram 36 (FIGURE 3) is snugly disposed within the transfer passage 31 for sliding movement forwardly and rearwardly therealong between the end walls 28 and 29. A pressure fluid cylinder 37 is centrally fastened to the rearward wall 36 by any convenient means, here screws 38 (FIGURE 1), and extends rearwardly therefrom. The pressure fluid cylinder 37 includes a piston rod 39 (FIGURE 3) which extends snugly but slideably through a coaxial opening 41 in the rearward wall 29 and threadedly engages the transfer ram 36 for reciprocating same along the transfer passage 31. A pair of support rods 42 and 43 (FIGURES 1 and 2) parallel the axis of the cylinder 37 and are preferably equally sidewardly spaced from opposite sides thereof. The support rods 42 and 43 snugly but slideably extend through suitable openings in the rearward wall 29 and are fixed, by any convenient means, not shown, to the transfer ram 36. The support rods 42 and 43 thus support the ram 36 for reciprocation along the transfer passage 31.

A rectangular opening 46 (FIGURES 3 and 4) through the upper wall 22 is disposed just ahead of the rearwardmost position of the transfer ram 36 shown in FIGURE 3. The opening 46 preferably extends from the side wall 26 to the side wall 27 for allowing communication between transfer structure 13 and the above-mentioned heating structure 14.

The forward wall 28 is pierced by a plurality, here two, of openings 47 (FIGURE 6). The rearward face of the forward wall 28 is covered by a perforated plate 49 (FIGURES 3 and 6) preferably affixed thereto by countersunk screws 51. If desired, conventional wire mesh screening may be used in the place of the plate 49. The openings in the perforated plate 49 cooperate with the openings 47 in the wall 28 to allow escape of air from the forward end of the transfer passage 31 when the transfer ram 36 is moved forwardly while preventing escape of plastic material pushed by said ram.

The feed structure 12 comprises a table 56 (FIGURE 3) supported on a plurality of upstanding columns 57 fixed by any convenient means, not shown, with respect to the platform 11. A feed pressure fluid cylinder 58 is supported on the table 56 and is provided with a vertically reciprocable piston rod 59 which extends downwardly through the table 56. A generally rectangular feed ram 61 is releasably affixed to and depends coaxially from the lower end of the piston rod 59 and is vertically reciprocable thereby.

The lower end of the feed ram 61 is slideably receivable through vertically aligned, rectangular openings 62 and 63 in the upper and lower walls 22 and 23, respectively, of the transfer housing 21. The openings 62 and 63 extend between the walls 26 and 27 and lie adjacent the perforated plate 49. Pairs of sidewardly spaced guide blocks 64 (FIGURES 2 and 3) slideably abut the forward and rearward faces of the feed ram 61 adjacent the side edges thereof and are fixed adjustably if desired, by any convenient means, such as screws 66 upon the upper wall 22. The guide blocks 64 precisely position the feed ram 61 with respect to the perforated plate 49 and the openings 62 and 63 to prevent interference therewith during downward movement of said ram. Side edge guides 67 are fixed, adjustably if desired, to the upper wall 22 at the side edges of the opening 62 by any convenient means such as screws for slideably guiding and sidewardly locating the feed ram 61.

A particular consuming device 17 (FIGURE 3) is here shown for purposes of illustration only. The consuming device shown includes a support block 71, depends from the forward end of the transfer housing 21 and is affixed thereto by any convenient means, such as screws 72. The support block 71 carries a plasticizing cylinder 73 in which a plasticizing screw 74 of any convenient type is rotatably disposed. A vertical feed passage 76 extends downwardly from the opening 63 to the screw 74 for snugly but slideably receiving the lower end of the feed ram 61. Thus, a charge of heated plastic material delivered by the transfer ram 36 to the upper end of the opening 63 will be forced by downward movement of the feed ram 61 into the screw 74. In the particular embodiment shown, the consumptive device 17 shown, comprises a portion of an injection molding machine disclosed in my copending application Ser. No. 459,222, now Patent No. 3,372,434.

Figure 4:
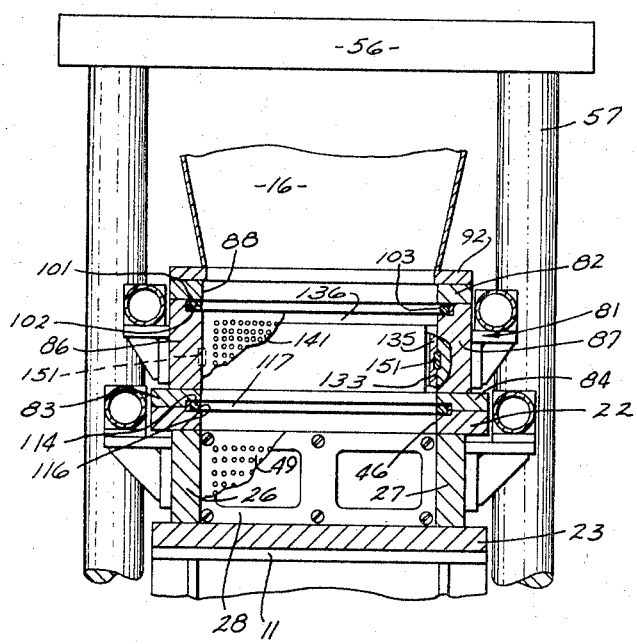
FIGURE 4 is a reduced, partially broken sectional view substantially as taken on the line IV—IV of FIGURE 3 but with the upper gate in its open position.

The heating structure 14 includes a rectangular heater housing 81 (FIGURES 3 and 4). The heater housing 81 comprises an upper wall 82 vertically supported by upstanding side walls 86 and 87. The side walls 86 and 87 are supported upon and affixed to the upper wall 22 of the transfer housing 21 by any convenient means including the spacers 83 and 84. The upper wall 82 has a rectangular opening 88 therethrough vertically centered on the opening 46 in the upper wall of the transfer housing 21. The opening 88 is preferably of somewhat less forward-rearward extent than the opening 46. The inner sideward edges of the opening 88, the side walls 86 and 87 of the heater housing, the spacers 83 and 84 and the opening 46 in the upper wall of the transfer housing 21 are preferably coplanar.

The hopper 16 (FIGURE 3) has an outlet neck 91 of rectangular cross section terminated by a transverse mounting flange 92. The mounting flange 92 is fixed, preferably by screws 93, to the upper wall 82. The cross section of the outlet 91 is preferably equal to or slightly less than that of the communicating opening 88. A pair of upstanding poles 94 (FIGURES 2 and 3) have feet 96 fixed, preferably by screws, to a rearward extension of the upper wall 22 of the transfer housing 21. The upper ends of the poles 94 assist in supporting the hopper 16. The heater structure 14 further includes an upper gate 101 (FIGURES 3 and 4) which comprises a horizontal plate slideably disposed in inwardly opening, longitudinal grooves 102 in the upper edges of the side walls 86 and 87 for reciprocation forwardly and rearwardly therealong. The upper gate 101 has a rectangular opening 103 intermediate the ends thereof which corresponds in size substantially to the openings 88. The rearward edge 104 (FIGURES 3 and 5) of the gate opening 103 is inclined rearwardly and upwardly for purposes appearing hereinafter.

The gate 101 extends sidewardly beyond the side walls 86 and 87 at its rearward edge as indicated at 111 and 112. An upper pair of pressure fluid cylinders 106 and 107 (FIGURES 1 and 2) are mounted on the side walls 86 and 87, respectively, by brackets 108 of any convenient type. The upper cylinders 106 and 107 have rearwardly extending piston rods 109 fixed to the corresponding rear edge portions 111 and 112 of the upper gate 101. The cylinders 106 and 107 are actuable for moving the gate 101 forwardly to align the opening 103 thereof with the opening 88 and neck 91 of the hopper. Retraction of the cylinders 106 and 107 moves the gate 101 forwardly for moving the opening 103 thereof substantially out of communication with the opening 88 whereby to block the lower end of the hopper 16. Inwardly opening longitudinal grooves 116 (FIGURE 4) are formed in the bottom edges of the spacers 83 and 84 and extend the length thereof. A shallow, upwardly opening recess 121 (FIGURES 3 and 4) is formed in the upper wall 22 between the sides of the grooves 116. The recess 121 extends rearwardly past the opening 46 through the rear edge of the upper wall 22. A plate-like lower gate 114 is slideably supported on the surface of the recess 121, the side edges of the lower gate 114 extending into the grooves 116. The lower gate 114 has a rectangular vertical opening 117 therethrough which corresponds in size substantially to the opening 46 of the transfer housing 21 and preferably is larger longitudinally of the heater housing than the opening 103. The side edge portions 122 of the lower gate 114 extend rearwardly past the poles 94 and terminate in a coplanar and preferably integral cross portion 123 which extends sidewardly therebeyond.

A lower pair of pressure fluid cylinders 126 and 127 (FIGURES 1 and 2), preferably having a slightly longer stroke than the upper cylinders 106 and 107, are mounted on the side walls 26 and 27, respectively, of the transfer housing 31 by means of brackets 128 of any convenient type. The upper cylinders 126 and 127 have rearwardly extending piston rods 129 affixed to the corresponding tips of the cross portion 123 of the lower gate 114. Thus, a rearward extension of the cylinders 126 and 127 moves the lower gate 114 rearwardly out of its position shown in the drawings to move the opening 117 out of communication with the opening 46. Conversely, retraction of the cylinders 126 and 127 moves the lower gate 114 forwardly to its position shown restoring communication between the openings 117 and 46.

Substantially rectangular inlet and outlet manifolds 131 and 132 (FIGURES 3, 4 and 5) are snugly but slideably disposed within the heater housing 81 adjacent the rearward and forward edges, respectively, of the openings 46 and 88 to define a heating chamber 133 therebetween. The manifolds 131 and 132 are preferably substantially similar. The vertical and sideward dimensions of the chamber are preferably substantially greater than the distance between the manifolds 131 and 132. The outlet manifold 132 comprises upper and lower walls 136 and 137 connected by side walls 135 and an outer or forward end wall 138 (FIGURES 4 and 5). Substantially upstanding corner bars 139 extend along the side walls 135 and connect the respective corners of the upper and lower walls 136 and 137. The inner or rearward face of the outlet manifold 132 is preferably closed by a perforated panel 141 of any convenient type. If desired, the panel 141 may be a wire mesh screen. The inlet manifold 131 is preferably similarly comprised of upper and lower walls 142 and 143, an outer end wall 144, bars 146 and a perforated panel 147. The perforated panels 141 and 147 preferably diverge downwardly at a small angle to the vertical.

The manifolds 131 and 132 may be supported by any convenient means for limited longitudinal sliding motion with respect to the heater housing 81. In the particular embodiment shown, the manifolds are slideably supported on the side walls 86 and 87 by suitable keys generally indicated at 151 in broken lines in FIGURES 3 and 4 disposed in matched keyways in the adjacent side walls of the manifolds and heater housing. Cover plates 150 (FIGURE 1) on the ends of the side walls 86 and 87 are removably mounted to limit outward movement of the manifolds 131 and 132 and the associated keys 151. Thus, the gates 101 and 114 do not engage and are freely slideable with respect to the manifolds.

A cross member 152 (FIGURES 2, 3 and 4) extends between the spacers 83 and 84 and is fixed with respect thereto behind the inlet manifold 131. An upstanding bracket 153 is mounted at the forward edge of the cross member 152 and rotatably supports an adjustment shaft 154. The forward end of the adjustment shaft 154 threadedly engages the rear wall 144 of the inlet manifold 131. The rearward end of the shaft 154 is provided with a handle 156 which is manually actuable for moving the inlet manifold 131 forwardly and rearwardly with respect to the inner housing for adjusting the size of the chamber 133 in accordance with the feeding rate of the feed ram 61. Rearward adjustment of the inlet manifold is preferably limited to prevent the perforated panel 147 from passing the rear edge of the opening 46.

A header 157 is adapted to communicate with a source H of heated fluid, preferably air, and in turn is connected by a pair of forwardly extending conduits 158 and 159 to the interior of the inlet manifold 131.

An outlet conduit 161 is fixed with respect to the heater housing 181 by any convenient means not shown, and extends snugly and slideably through a central opening in the forward wall 138 of the outlet manifold 132 for exhausting same. The outlet conduit 161 may be vented to the atmosphere or returned to the source H. If desired, the outlet conduit 161 may be connected to a suitable suction device of any convenient type, not shown.

The rearward wall 138 of the outlet manifold 132 is connected through a lost motion linkage generally indicated at 162 with the lower gate 114 (FIGURES 2 and 5). The lost motion linkage 162 comprises an upstanding bracket 163 fixed with respect to the forward end of the lower gate 114. The bracket 163 extends substantially across the width of the outlet manifold 132 and is spaced forwardly therefrom. Spaced pins 164 extend forwardly from the bracket 163 and enter the manifold 132 through suitable openings 166 in the forward wall 138 thereof. The rearward ends of the pins 164 are provided with heads 167 for engaging the wall 138. Thus, as the lower gate 114 ends its forward motion, the heads 167 of the pins 166 engage the wall 138 and pull the outlet manifold 131 forwardly. The perforated panel 141 is thereby disengaged from the charge of plastic material and moved for a short distance (3/16 inch in the present embodiment) away from said charge to its position shown in FIGURES 3 and 5 so as to allow same to drop freely through the openings 117 and 46 out of said chamber. The outlet manifold preferably is not retracted sufficiently to expose the forward edges of the openings 117 and 46 to avoid catching the charge on such edges. The boss 168 on the pin 164 adjacent the bracket 163 engages the forward face of the wall 138 at the end of rearward movement of the lower gate 114 for moving the outlet manifold 132 and, hence, the perforated wall 141 rearwardly into the normal chamber defining position for receiving a new charge of material to be heated.

A control unit 171 is disposed between a source S of fluid under pressure such as conventional hydraulic fluid and conduits schematically actuated by broken lines 170 (FIGURE 1) leading to the pressure fluid cylinders 37, 58, 106 and 107 and 126 and 127 sequencing the operation thereof as hereinafter described. The control unit 171 is preferably connected by any convenient means, indicated schematically in FIGURE 3 by the broken lines 169 and 173 for controlling the operation of the screw 74 and heated fluid source H. A limit switch 172 is preferably provided in the path of the piston rod 59 for sensing the approach of the ram 61 to its lower limit. The switch 172 is connected to the control unit 171.

*Operation*

The operation of the machine 10 can be briefly summarized in the following manner. First, the heating chamber 133 is filled with a charge of granulated plastic material to be heated. Thereafter, heated fluid, preferably air, is introduced to the heating zone comprised by the manifolds 131 and 132 and the chamber 133 via the inlet region thereof defined within the inlet manifold 131. The heated fluid passes uniformly through the charge in the chamber 133 for uniformly heating the charge and then passes out of the opposite side of the zone through an outlet region defined within the outlet manifold 132. After the charge has been heated for a predetermined length of time, corresponding to a predetermined terminal temperature of the chamber, the outlet region is retracted from the charge by moving the outlet manifold 132 forwardly and the bottom of the chamber is opened to allow the charge to fall out therefrom. The charge is then engaged by the transfer and feed rams 36 and 61 in sequence to feed same to the consuming device 17.

Considering the operation of the machine 10 in more detail, the cycle of the operation begins with the upper gate in its close position shown in FIGURE 3 and the lower gate 114 in closed position which is to the right of its position shown in FIGURE 3. The source H of heated fluid is initially shut off. The hopper 16 will normally be filled with granules of plastic material to be heated.

To initiate operation, the control unit 171 is energized to extend the upper cylinders 106 and 107. Such extension opens the upper gate 101 to place the opening 103 thereof in communication with and between the opening 88 and the upper end of the chamber 133. This allows the granules of plastic material to fall into and fill the heating chamber 133. The control unit 171 then causes the upper cylinders 106 and 107 to retract thereby moving the upper gate 101 leftwardly to its position shown in FIGURE 3 whereby the trailing edge 104 of the opening 103 separates the granules in the chamber 133 from the granules trapped in the openings 103, 88 and located thereabove in the hopper 16.

The control unit 171 then causes the source H to feed heated air through the conduits 158 and 159 into the inlet manifold 131. The heated air then passes forwardly through the perforations of the panel 147 in a uniformly distributed manner and into and through the charge of granules in the chamber 133. The air then passes through the perforated panel 141 into the outlet manifold and thence through outlet conduit 161. The air flow is sufficiently fast as to eject dust and fines from the charge and carry same out the outlet conduit 161. Such ejection of the fines is particularly advantageous in that such undersize particles are generally plasticized more quickly than the accompanying larger granules by common plasticizing devices such as the plasticizing screw 74. Depending on the material involved, the fines may burn or otherwise degenerate on the screw and produce black spots or other imperfections in the product. The air velocity is, however, not so fast as to agitate or materially disturb the positions of the particles with respect to each other. The heating of the granules progresses quickly due to the free circulation of heated air therethrough. The granules gradually soften and stick to each other so that the charge substantially becomes a unitary cake. The pressure of the incoming air tends to hold the granules adjacent the perforated panel 147 of the inlet manifold out of contact with said panel. Thus, there is no tendency for the softened cake to become mechanically locked to or to adhere to the perforated inlet panel 147.

When the heating of the now cake-like charge is completed, the control unit 171 shut off the hot air source H and retracts the lower cylinders 126 and 127 to open the lower gate 114 by moving same forwardly to its position shown in the drawings, whereby the opening 117 thereof is aligned with and communicates between the lower end of the chamber 133 and the opening 46 in the upper wall 22 of the transfer housing 21. During the last part of its opening stroke, the bracket 163 at the forward end of the lower gate 114 moves the outlet manifold 132 forwardly for a small distance, which is the particular embodiment shown is 3/16 of an inch. This increases the forward-rearward length of the chamber 133 by moving the perforated panel 141 out of contact with and away from the cake. By thus withdrawing the panel 147, granules partially lodged in the perforations of the outlet panel 147 during filling of the chamber 133 or during the subsequent flow of heated air, are released from such mechanical engagement with the panel and so cannot prevent the cake from dropping out of the chamber 133. Thus, the cake drops through the openings 117 and 46 into the rearward end of the transfer passage 33.

The cake drops in front of the transfer ram 36, which is at this point in its rearwardmost or retracted position shown in the drawings. It should be noted that the feeding ram 61 is preferably also in its retracted or uppermost position shown in FIGURE 3. The control unit 171 now energizes the pressure fluid cylinder 37 for causing the transfer ram 36 to move the cake forwardly to a position adjacent the perforated wall 49 and beneath the feed ram 61, the cake preferably falling into the passage 76. The control unit 171 preferably then causes the ram 36 to be moved rearwardly by the cylinder 37. Simultaneously, the feed ram 61 is moved downwardly by the cylinder 58. The feed ram 61 forces the cake downwardly through the opening 63, into the feed passage 76 and against the screw 74. Air pushed ahead of the cake as it is moved forwardly by the transfer ram 36 escapes through the perforations in the plate 49 and through the openings 47 in the forward end wall 28. Air pushed ahead of the charge as it drops through the feed passage 76 escapes upwardly therepast and past the ram 61 into the transfer chamber 31.

The operation of the screw 74 is preferably also controlled by the control unit 171 as indicated schematically by the broken line 169 in FIGURE 3, whereby said screw will start to turn only after the feed ram 61 has crushed the cake firmly thereagainst in order to avoid air pockets along the length of the screw 74 which might cause burning of the material being plasticized thereby. The feed ram 61 continues downward pressure of a predetermined magnitude on the cake as the screw 74 rotates and gradually consumes said cake.

Substantially simultaneously, with the above-mentioned forward movement of the ram 36, the control unit 171 extends the lower cylinders 126 and 127 to move the lower gate 114 and, hence, the opening 171 rearwardly out of registry with the opening 46 for closing the lower end of the chamber 133. At the end of its rearward stroke, the boss 168 on the lower gate 114 moves the outlet manifold 152 from its position shown in the drawings rearwardly toward the inlet manifold 131 and to its normal operative position. The cylinders 106 and 107 then move the upper gate 101 forwardly to open same and allow pastic granules from the hopper 16 to fall through the registered openings 88 and 103 into the chamber 133 to fill the chamber 133 with a second charge. This begins a second cycle of the machine 10. Thus, the second cycle of the machine is begun while the first is still to be completed since the second charge is heated in the chamber 133 while the first charge is being forced into the rotating screw 74 by the feed ram 61. Normally, the feed ram 61 will feed substantially all of the first charge into the screw 74 before the second charge has been completely heated.

As the feed ram 61 closely approaches its lowermost position, it actuates the limit switch 172 which signals the control unit 171 to raise the feed ram 161 to its upper position shown in FIGURE 3 and simultaneously to shut off the screw 74 for ending the first machine cycle. The second cycle continues with feeding of the second charge by the rams 36 and 61 as hereinabove described with respect to the first charge. Under certain conditions, such as excessive charge size, the feed ram 61 may not complete its feeding of the first charge to the screw 74 prior to the completion of the heating of the second charge. Under such condition, the control unit 171 is preferably arranged to shut off the screw 74 and raise the ram 61 as heating of said second charge is completed. Completion of the second cycle of the machine would then occur in the normal manner except that the start of heating of a further charge would preferably be prevented until after the second charge had been fully fed to the ram 74. Such might be readily accomplished by omitting the third cycle completely, i.e., by not opening the upper gate 101 at the normal time for beginning a third cycle, the fourth cycle thereafter taking place in the normal manner.

Should the charge be too large to be fed in the time normally provided, as above discussed, the operator of the machine may reduce the size of the next charge to be heated by actuation of the handle 156 to move the inlet manifold inwardly and, hence, to reduce the size of the chamber 133. On the other hand, should the feed ram 61 complete its feeding well before the completion of the heating of the next charge, the operator may at any point use the handle 156 to move the manifold 131 rearwardly to enlarge the chamber 133 and, hence, the size of the charge next admitted thereto. Thus, maximum utilization of the feed ram 61 and heating chamber 133 can be obtained by proper setting of the handle 156.

The downward pressure of the feed ram 61 is normally sufficient to crush the cake tightly onto the screw but preferably is not sufficient to push the cake past the lands of the screw. If desired, the feed ram 61 and/or the block 71 may be cooled by any convenient and known means not shown.

If desired, any convenient means indicated schematically at F in FIGURE 2 may be used to extract the fines entrained in the air in the exhaust conduit 161 to allow recycling of the heated air.

If cakes of the proper size are fed, both the chamber 133 and the feed ram 61 will be simultaneously and substantially continuously operating. Also, the transfer of a cake from the chamber 133 to the feed passage 76 takes a relatively short time as compared to the total length of a cycle. Thus, the screw 74 will normally be almost continuously fed with preheated material by the machine 10.

*Modification*

FIGURES 7, 8 and 9 disclose machine 177 which is a modification of the machine 10 of FIGURE 1. Parts of the machine 177 are similar to those of the machine 10 shown in FIGURE 1 and will be designated by the same reference numerals thereas with the suffix "a" added thereto. The machine 177 differs from the machine 10 in providing a charge holding unit 175 including a transversely extended plate 176 between the mounting flange 92a and the upper wall 82a of the machine 177. If desired, a gasket 178 may be placed between the plate 176 and mounting flange 92a. The gasket 178 and plate 176 have aligned rectangular openings therethrough which are in registry with and preferably identical in size to the outlet opening of the hopper 16a and the opening 88a in the upper wall 82a. The ends 181 and 182 of the plate 176 extend sidewardly beyond the upper wall 82a. Depending brackets 183 and 184 are affixed to the ends 181 and 182 by any convenient means such as screws 186.

Preferably identical stripping devices 187 and 188 are supported by the brackets 183 and 184, respectively. Each of the devices 187 and 188 includes a pressure fluid cylinder 191 mounted on and extending sidewardly from the mounting bracket and having a piston rod 192 extending horizontally toward the adjacent side wall of the heating unit 81a. A clearance slot 190 is provided in the lower end of the piston rod 192 of each bracket. The inner end of each piston rod 192 threadedly engages an upstanding block 194 which mounts a preferably identical and parallel pair of stripper rods 196 and 197. The stripper rods 196 and 197 extend through clearance openings 198 and 199, respectively, in the mounting bracket 108a of the adjacent one of the upper pressure fluid cylinders 106a and 107a. The stripper rods 196 and 197 further extend through preferably bushed openings 201 and 202, respectively, in the adjacent one of the side walls 86a and 87a. The units 187 and 188 are located forwardly of the center of the heating chamber 133a whereby the stripper rods 196 and 197 thereof lie closely adjacent the outlet manifold 132a.

The cylinders 191 of the units 187 and 188 are preferably operated by the control unit 171a simultaneously and in an identical fashion. Retraction of the piston rods 192 of the pressure fluid cylinders 191 moves the sets of the stripper rods 196 and 197 out of the chamber 133a the end surfaces of the stripper rods perferably being flush with the inner surfaces of the walls 86a and 87a as shown in FIGURE 8 with respect to the stripping device 188. Conversely, extension of the piston rods 192 of the cylinders 191 extends the stripper rods 196 and 197 into the heating chamber 133a as shown in FIGURE 8 with respect to the unit 187. The stripper rods 196 and 197 of the units 187 and 188 when extended have their ends closely adjacent to and coaxial with each other. The piston rods 192 of the units 187 and 188 are extended preferably before a charge of plastic granules is admitted to the heating chamber 133a and when said chamber is empty. Thereafter, a charge of plastic granules may be admitted to the chamber 133a as discussed hereinabove with respect to the machine 10 of FIGURE 1. The charge is then subjected to a first period of heating by air from the inlet manifold 131a during which the granules cohere to form a unitary cake containing the inner ends of the stripper rods. The surface of the cake does not, however, adhere significantly to the surfaces of the chamber 133a during this first heating period. At the end of the first heating period, the control unit 171a opens the lower gate 114a and simultaneously retracts the outlet manifold 132 through a short distance away from the cake as hereinabove described with respect to the embodiment of FIGURE 1. The extended stripper rods 196 and 197 support the cake in the chamber 133a as heated air continues to flow from the inlet manifold 133a to further heat the cake during the second heating period. The cake achieves a substantially higher temperature during the second heating period and may be heated sufficiently that its surface becomes quite soft and in some cases sticks thereby tending to become difficult to remove from roughened or perforated surfaces engaged thereby. In the present embodiment, the adhesive surface of the cake is out of contact with the perforated walls 141a and 147a as well as the upper surface of the lower gate 114a and so cannot adhere thereto. At the end of said second period, the heated air is shut off and the cylinders 191 are actuated to remove the stripper rods 196 and 197 from the chamber 133a thereby removing all support from the cake and allowing same to drop through the openings 117a and 46a into the transfer passage for subsequent feeding to a consuming device as hereinabove described with respect to the embodiment of FIGURE 1. The smooth and relatively small surfaces of the sides and top of the chamber provide little or no vertical support for the heated cake. Thus, the units 187 and 188 allow a charge to be heated to the point of producing an adhesive surface thereon yet prevent the cake, as a whole or in part, from becoming stuck in the chamber 133a and on the panel 141a. There is no need for rams or the like for positively moving the charge out of the heating chamber, the charge in all cases falling freely from the chamber when released by the units 187 and 188.

FIGURE 10 discloses a further modified machine 212 which includes a feedback system 211 for automatically adjusting the size of the heating chamber 133b and, hence, of the charge in accordance with the requirements of the consuming device 17b being fed. Parts of the machine 212 corresponding to parts of the machine 10 of FIGURE 1 will be referred to by the same reference numerals thereas with the suffix "b" added thereto. The system 211 includes a pair of limit switches 213 and 214 located for actuation in response to downward movement of the feed ram 61b as it nears its lowermost position. In the particular embodiment shown, the switches 213 and 214 are located for actuation by the lower end of the piston rod 59b. The switch 213 is preferably located somewhat, and in the particular embodiment shown, a quarter inch, above the limit switch 214 so as to be actuated before the switch 214 as the feed ram 61b moves downwardly. The switches 213 and 214 are connected to a motor control 216 which in turn connects through conductors 217 and 218 to a reversible motor 219. The motor control 216 may be of any convenient type capable of running the motor 219 in a forward or reverse direction or stopping same in accordance with preselected conditions of the switches 213 and 214. Switches 221 and 222 are place on the lines 217 and 218, respectively, between the control 216 and motor 219 and are opened and closed by the control unit 171b of the machine 212.

The motor 219 drives a speed reduction box 223 whose output shaft 224 supports a lever 226. The gear box 223 may be of any convenient type capable of providing a slow pivoting of the lever 226 in response to rotation of the motor 219, the forward and rearward directions of motion of the lever 226 corresponding to forward and rearward rotation of the motor 219.

The inlet manifold 227 of the machine 212 is substantially similar to the manifold 131 of the machine 10 shown in FIGURE 3 but omits the bracket 153 and threaded shaft 164 which is associated with the latter. Instead, the rearward wall 144a of the inlet manifold 227 has a rearwardly extending lug 228. A link 229 is pivotally connected at the forward end thereof with the lug 228 and at the rearward end thereof with the lever 226 on the reduction box 223.

Concerning operation of the feed back system 211, the control unit 171b normally maintains the switches 221 and 222 open. As the feed ram 61b moves downwardly to press a cake into the screw 74b, the piston rod 59b moves downwardly toward the limit switches 213 and 214. The control unit 171b is preferably arranged to close the switches 221 and 222 immediately prior to or at the instant of raising the feed ram 61b and hence the moment when the charge is being dropped from the chamber 133b as hereinabove discussed with respect to the embodiment of FIGURE 1. If neither limit switch is tripped when the switches 221 and 222 close, the motor control 216 energizes the motor 219 through the lines 217 and 218 to move the lever 226 and, hence, the inlet manifold forwardly to reduce the size of the chamber 133b. This will reduce the size of the next charge in the chamber 133b in response to the failure of the ram 61b to complete feeding of a previously heated charge to the screw 74b. On the other hand, if the rod 59b energizes the switch 213 but not the switch 214, the motor control supplies no signal to the lines 217 and 218. In this condition, the size of the charge under the ram 61b is within a predetermined satisfactory range and, therefore, the motor 219 is not energized and the chamber size will remain unchanged. Finally, actuation of both the switches 213 and 214 by the piston rod 59b while the switches 221 and 222 are closed causes the motor control 216 to energize the motor 219 in a reverse direction to move the lever 226 and, hence, the inlet manifold rearwardly to increase the size of the chamber 133b. Thus, should the charge under the ram 61b be undersized, the system 211 will cause the charge next heated after said actuation of the switch 214 to be increased in size.

The switch 213b is preferably of a spring loaded type which is deactuated upon release. On the other hand, the switch 214 preferably remains actuated at least until the switches 221 and 222 close, should the ram 61b be raised prematurely after actuating the switch 214. The volume of the chamber 133b is preferably adjusted by a relatively small amount per cycle so that correction of charge size will normally take several machine cycles to minimize overshoot in correcting.

Although particular preferred embodiments of the invention have been disclosed for illustrative purposes, it will be understood that variations or modifications thereof which lie within the scope of the appended claims are fully contemplated.

The embodiments of the invention in which an exclusive property or privilege is claimed are defined as follows:

1. In a machine for heating a granular organic plastic material, the combination comprising:
   a source of granular plastic material;
   wall means defining a heating chamber and means for admitting granules to said chamber from said source;
   means for admitting a flow of heated fluid into one region of said chamber and means in an other region of said chamber for allowing exit of said fluid therefrom, said regions being arranged for allowing uniformly distributed fluid flow through said granules in said chamber;
   gate means for allowing heated granules to be removed from said chamber;
   means actually in synchronism with said gate means for moving said wall means adjacent said another region away from said charge whereby heated plastic material is disengaged from said last-mentioned region and allowed to exit the chamber.

2. A heating device for granular organic plastic material, comprising in combination:
   a heater housing;
   a fluid inlet manifold and a fluid outlet manifold located in said housing and spaced to define a heating chamber therebetween, said manifolds having downwardly divergent, perforate walls facing said heating chamber;
   hopper means located above said heating chamber for holding granular plastic material and upper gate means separating said hopper means from said heating chamber;

lower gate means for closing the bottom of said heating chamber;

means operable in synchronism with opening of said lower gate means for moving said outlet manifold away from said inlet manifold to assure release of a heated cake of granules from said chamber.

3. The machine defined in claim 2, in which said lower gate means comprises a plate supported for horizontal reciprocation on said housing and said last-named means comprises a lost motion linkage connected between said outlet manifold and said lower gate for moving said outlet manifold away from said inlet manifold at the end of the opening stroke of said lower gate and for returning said outlet manifold toward said inlet manifold at the end of the closure stroke of said lower gate.

4. The device defined in claim 1, including a transfer housing located beneath said heater housing, a transfer ram reciprocable in said transfer housing below said heating chamber and means for causing reciprocation of said transfer ram;

a feed ram chamber transverse to and in communication to said transfer housing at a location spaced from said heating chamber;

a feed ram reciprocable along said feed chamber and means for reciprocating said feed ram;

consuming means in communication with said feed chamber and spaced from said transfer housing.

5. The device defined in claim 2, wherein said upper and lower gates comprise plates having aperautres therein corresponding to the area of said heating chamber at the upper and lower ends, respectively, thereof and in which said inlet manifold is reciprocably disposed in said housing for movement toward and away from said outlet manifold and including manually adjustable means connected between said housing and said inlet manifold for adjusting the position of said inlet manifold with respect to said outlet manifold.

6. A machine for heating a charge of granular organic plastic material, comprising in combination:

means defining a multiwalled preheating chamber;

extensible means insertable into said chamber for embedding in the charge of granules and means for retracting said extensible means from said chamber;

a source of granular plastic material located above said chamber and gate means actuable for connecting said source with said chamber for filling same with granules;

means associated with the side walls of the chamber for heating the charge of plastic granules in said chamber;

means for opening the bottom of said chamber and means for separating said charge and an opposed pair of the side walls of said chamber at least by the time the charge is partially heated;

whereby after release of said charge by said opposed pair of side walls and after opening of said bottom of said chamber, said extensible means supports the charge for additional heating and retraction of extensible means allows said charge to drop.

7. A machine for heating a granular organic plastic material, comprising in combination:

a source of material to be plasticized;

means defining a chamber beneath said source, such means including a laterally spaced inlet and outlet manifold, said inlet manifold being provided with perforate walls defining opposed side walls of said chamber, said inlet manifold being provided for supplying a source of heated flow fluid through said chamber and said outlet manifold being provided for allowing escape of fluid from said chamber;

a plurality of extended elements extending into said chamber adjacent and laterally along said perforate wall of said outlet manifold and means energizable for retracting said element from said chamber;

inlet gate means between said source and said chamber actuable for filling said chamber with a charge of granules to be heated;

outlet gate means for opening the bottom end of the chamber and means associated therewith for retracting outlet manifold away from the heated charge whereby said charge may be supported on said extended elements for heating after opening of said outlet gate means and retraction of said outlet manifold and may be dropped from said chamber upon retraction of said elements.

8. The device defined in claim 7, in which said chamber has further side walls extending between said manifolds, said extensible elements comprise vertically spaced, horizontally extend rods slideably in pairs through each of said side walls, and said energizable means comprise a pressure fluid cylinder fixed with respect to each of said further side walls.

9. A device for heating and feeding granular organic plastic material, comprising in combination:

means defining a walled heating chamber and means for heating said chamber;

a source of granules to be heated connectible to said chamber;

movable plastic feeding means and means for supporting said feeding means with heated material from said chamber;

means for sensing the position of said feeding means;

means supporting at least one wall of said chamber for inward and outward movement with respect to the center of said chamber and motor means associated therewith for effecting reciprocation of said wall and connected to said sensing means whereby displacement of the feeding means from a desired position will cause said sensing means and said motor means to adjust the amount of a subsequent charge to said chamber to compensate for such deviations.

10. The device defined in claim 2, in which said inlet manifold is supported for reciprocation with respect to said housing and including a ram, means supplying said ram with material from said heating chamber and pair of limit switches spaced along the path of the ram actuable in sequence upon movement of said ram in one direction;

a reversible motor and link means reciprocable thereby and connected to said inlet manifold for reciprocating same in response to energization of said motor;

means connecting said limit switches with said motor for moving said inlet manifold inwardly of said chamber if said switches are not actuated, for not moving said inlet manifold if only one of said limit switches is actuated and for moving said inlet manifold outwardly of said chamber if both said limit switches are actuated.

11. A heating device for granular organic plastic material, comprising in combination:

a heater housing;

a fluid inlet manifold and a fluid outlet manifold located inside the housing and spaced to define a heating therebetween, said manifolds having opposite perforate walls facing said heating chamber;

hopper means located above said heating chamber for holding granular plastic material and upper gate means separating said hopper means from said heating chamber;

lower gate means for closing the bottom of said heating chamber;

means operable in synchronism with the opening of said lower gate means for moving said outlet manifold away from said inlet manifold to assure release of a heated cake of granules from said chamber.

12. A heating device for granular organic plastic materials, comprising in combination:
- a heater housing;
- a fluid inlet manifold and a fluid outlet manifold located in said housing and spaced to define a heating chamber therebetween, said manifold having substantially planar opposite perforate walls facing said heating chamber;
- hopper means located above said heating chamber for holding granular plastic material and upper gate means separating said hopper means from said heating chamber;
- lower gate means for closing the bottom of said heating chamber;
- means operable for opening said lower gate means for permitting a heated cake of granules to be discharged from said chamber; and
- means for moving the perforate wall of said outlet manifold away from said inlet manifold to assure release of the heated cake of granules from the chamber when the lower gate means is moved to an open position.

13. In a machine for heating a granular organic plastic material, the combination comprising:
- a source of granular plastic material;
- wall means defining a heating chamber and means for admitting granules to said chamber from said source;
- means for admitting the flow of heated fluid into one region of said chamber and means in another region of said chamber for allowing exit of said fluid therefrom, said regions being arranged for allowing uniformly distributed fluid flow through said granules in said chamber;
- gate means for allowing heated granules to be removed from said chamber;
- means actuable for moving said wall means adjacent said another region away from said charge whereby heated plastic material is disengaged from said last-mentioned region and allowed to exit the chamber when said gate means is moved into an open position.

References Cited

UNITED STATES PATENTS 3,163,888   1/1965   Shattuck _____ 263—29
3,176,969   4/1965   Storm et al. _____ 263—29

JOHN J. CAMBY, *Primary Examiner.*

U.S. Cl. X.R.

34—174